(12) United States Patent
Kondo et al.

(10) Patent No.: US 11,745,455 B2
(45) Date of Patent: *Sep. 5, 2023

(54) DEVICE AND METHOD FOR PRODUCING UNVULCANIZED RING-SHAPED RUBBER MEMBER

(71) Applicant: The Yokohama Rubber Co., LTD., Tokyo (JP)

(72) Inventors: Masatomo Kondo, Kanagawa (JP); Chihiro Zenyoji, Kanagawa (JP); Teruaki Kunimori, Kanagawa (JP); Jyumpei Oishi, Kanagawa (JP); Haruhisa Hasegawa, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/596,552

(22) PCT Filed: Apr. 21, 2020

(86) PCT No.: PCT/JP2020/017207
§ 371 (c)(1),
(2) Date: Dec. 13, 2021

(87) PCT Pub. No.: WO2020/255555
PCT Pub. Date: Dec. 24, 2020

(65) Prior Publication Data
US 2022/0203641 A1 Jun. 30, 2022

(30) Foreign Application Priority Data
Jun. 17, 2019 (JP) .................................. 2019-112133

(51) Int. Cl.
*B29D 30/30* (2006.01)
*B29D 30/26* (2006.01)

(52) U.S. Cl.
CPC .......... *B29D 30/3007* (2013.01); *B29D 30/26* (2013.01); *B29D 2030/2685* (2013.01); *B29D 2030/2692* (2013.01)

(58) Field of Classification Search
CPC ............ B29D 2030/2685; B29D 30/30; B29D 30/3007
See application file for complete search history.

(56) References Cited

U.S. PATENT DOCUMENTS

| | | | | |
|---|---|---|---|---|
| 5,935,377 | A | * | 8/1999 | Sergel ..................... B29C 65/00 156/405.1 |
| 6,379,493 | B1 | * | 4/2002 | Berning ............. B29D 30/3007 156/422 |
| 2012/0111473 | A1 | * | 5/2012 | Hasegawa ............... B29C 66/92 156/64 |

FOREIGN PATENT DOCUMENTS

| | | |
|---|---|---|
| JP | 62-236728 A | 10/1987 |
| JP | 2003-11245 A | 1/2003 |

(Continued)

OTHER PUBLICATIONS

Translation of JP-2014136317-A (Year: 2014).*
Translation of JP-2017213702-A (Year: 2017).*

*Primary Examiner* — Xiao S Zhao
*Assistant Examiner* — John J DeRusso
(74) *Attorney, Agent, or Firm* — THORPE NORTH & WESTERN

(57) ABSTRACT

In a method for producing an unvulcanized ring-shaped rubber member a front edge portion of a band-like rubber member conveyed by a conveyor is disposed on an outer circumferential surface of a forming drum, and the forming drum is rotated to wind a length of the band-like rubber member on the outer circumferential surface and a rear edge portion is held by rear edge holding portions arranged side by side in a width direction. Using distribution data on a (Continued)

length of the band-like rubber member in the width direction, an amount of movement of movement portions in a front-rear direction is controlled to adjust the degree of elongation around the held portion of the rear edge portion in the front-rear direction that is held by each of the rear edge holding portions, and the front and rear edge portions are bonded to produce a ring-shaped rubber member.

5 Claims, 17 Drawing Sheets

(56) References Cited

FOREIGN PATENT DOCUMENTS

| JP | 2014136317 A | * | 7/2014 |
| JP | 2015-136826 A | | 7/2015 |
| JP | 2017213702 A | * | 12/2017 |

* cited by examiner

DEVICE AND METHOD FOR PRODUCING UNVULCANIZED RING-SHAPED RUBBER MEMBER

TECHNICAL FIELD

The present technology relates to a device and a method for producing an unvulcanized ring-shaped rubber member, and particularly relates to a device and a method that are capable of producing an unvulcanized ring-shaped rubber member by bonding longitudinal end portions of an unvulcanized band-like rubber member on an outer circumferential surface of a forming drum over the entire width direction evenly and more reliably.

BACKGROUND ART

When producing a rubber product such as a tire or the like, there exists a step in which the longitudinal end portions of the unvulcanized band-like rubber member are bonded on the outer circumferential surface of the forming drum and formed into a ring shape. Various devices for accurately bonding the longitudinal end portions of the band-like rubber member have been proposed (for example, see Japan Unexamined Patent Publication No. 2015-136826).

In the device proposed in Japan Unexamined Patent Publication No. 2015-136826, the contraction portion that contracts the most in the front edge portion of the unvulcanized band-like rubber member is stretched by the stretching device, and then applied to the outer circumferential surface of the forming drum (see paragraph 0022 to 0024, etc.). Next, the angle of the rear end edge of the rear edge portion of the band-like rubber member is displaced so as to match the angle of the front end edge of the front edge portion, and the rear edge portion and the front edge portion are bonded (see paragraph 0028, etc.).

In this proposal, it is assumed that the contraction portion that contracts the most in the front edge portion of the band-like rubber member is the thinnest portion in the front edge portion (paragraph 0020, etc.). However, the contraction portion that contracts the most is not necessarily the thinnest portion. Furthermore, the angle of the front end edge of the front edge portion that is applied to the forming drum is not necessarily uniform, and may vary in the width direction. Therefore, simply adjusting the angle of the rear end edge of the rear edge portion of the band-like rubber member to the angle of the front end edge of the front edge portion is not enough to bond the front edge portion and the rear edge portion without gaps across the entire width direction of the band-like rubber member. That is, there is room for improvement in bonding the longitudinal end portions of the unvulcanized band-like rubber member on the outer circumferential surface of the forming drum over the entire width direction evenly and reliably.

SUMMARY

The present technology provides a device and a method that are capable of producing an unvulcanized ring-shaped rubber member by bonding the longitudinal end portions of the unvulcanized band-like rubber member on the outer circumferential surface of the forming drum over the entire width direction evenly and more reliably.

The device for producing an unvulcanized ring-shaped rubber member according to the present technology includes: a transport conveyor that transports an unvulcanized band-like rubber member toward a forming drum; a front edge arrangement mechanism that holds and disposes a front edge portion of the band-like rubber member onto an outer circumferential surface of the forming drum; a rear edge bonding mechanism that holds and bonds a rear edge portion of the band-like rubber member to the front edge portion on the outer circumferential surface; and a control unit configured to control movement of the transport conveyor, the front edge arrangement mechanism, and the rear edge bonding mechanism, the front edge portion and the rear edge portion of the band-like rubber member wound around the outer circumferential surface being bonded by a preset allowable bonding margin, the rear edge bonding mechanism including a plurality of holding portions arranged side by side in a width direction of the band-like rubber member, and movement portions that individually move each of the holding portions in a front-rear direction of the band-like rubber member, and before bonding the rear edge portion to the front edge portion, the control unit controlling an amount of movement of each of the movement portions in the front-rear direction using distribution data on a length of the band-like rubber member in the width direction, and thus a degree of elongation around a held portion of the rear edge portion in the front-rear direction that is held by each of the holding portions being adjusted.

The method for producing an unvulcanized ring-shaped rubber member according to the present technology includes: conveying an unvulcanized band-like rubber member toward a forming drum by a transport conveyor; disposing a front edge portion of the band-like rubber member on an outer circumferential surface of the forming drum; winding a predetermined length of the band-like rubber member on the outer circumferential surface of the forming drum by rotating the forming drum; and bonding the front edge portion on the outer circumferential surface and a rear edge portion of the band-like rubber member by a preset allowable bonding margin, the rear edge portion being held by a plurality of holding portions arranged side by side in a width direction of the band-like rubber member to allow each of the holding portions to move in a front-rear direction individually by respective movement portions, and before bonding the rear edge portion to the front edge portion, a control unit controlling an amount of movement of the respective movement portions in the front-rear direction using distribution data on a length of the band-like rubber member in the width direction, and thus a degree of elongation around a held portion of the rear edge portion in the front-rear direction that is held by each of the holding portions being adjusted.

According to the present technology, before bonding the rear edge portion of the band-like rubber member to the front edge portion of the band-like rubber member on the outer circumferential surface of the forming drum, the control unit controls the amount of movement of each of the movement portions in the front-rear direction, using the distribution data of the length of the band-like rubber member in the width direction, to adjust the degree of elongation around the held portion of the rear edge portion in the front-rear direction that is held by each of the holding portions. As a result, the length of the band-like rubber member can be adjusted to a length that allows the front edge portion and the rear edge portion to be bonded by an allowable bonding margin. Therefore, by bonding the front edge portion and the rear edge portion after this adjustment operation, an unvulcanized ring-shaped rubber member that is bonded evenly and more reliably over the entire width direction can be produced.

DETAILED DESCRIPTION

Figure 1:
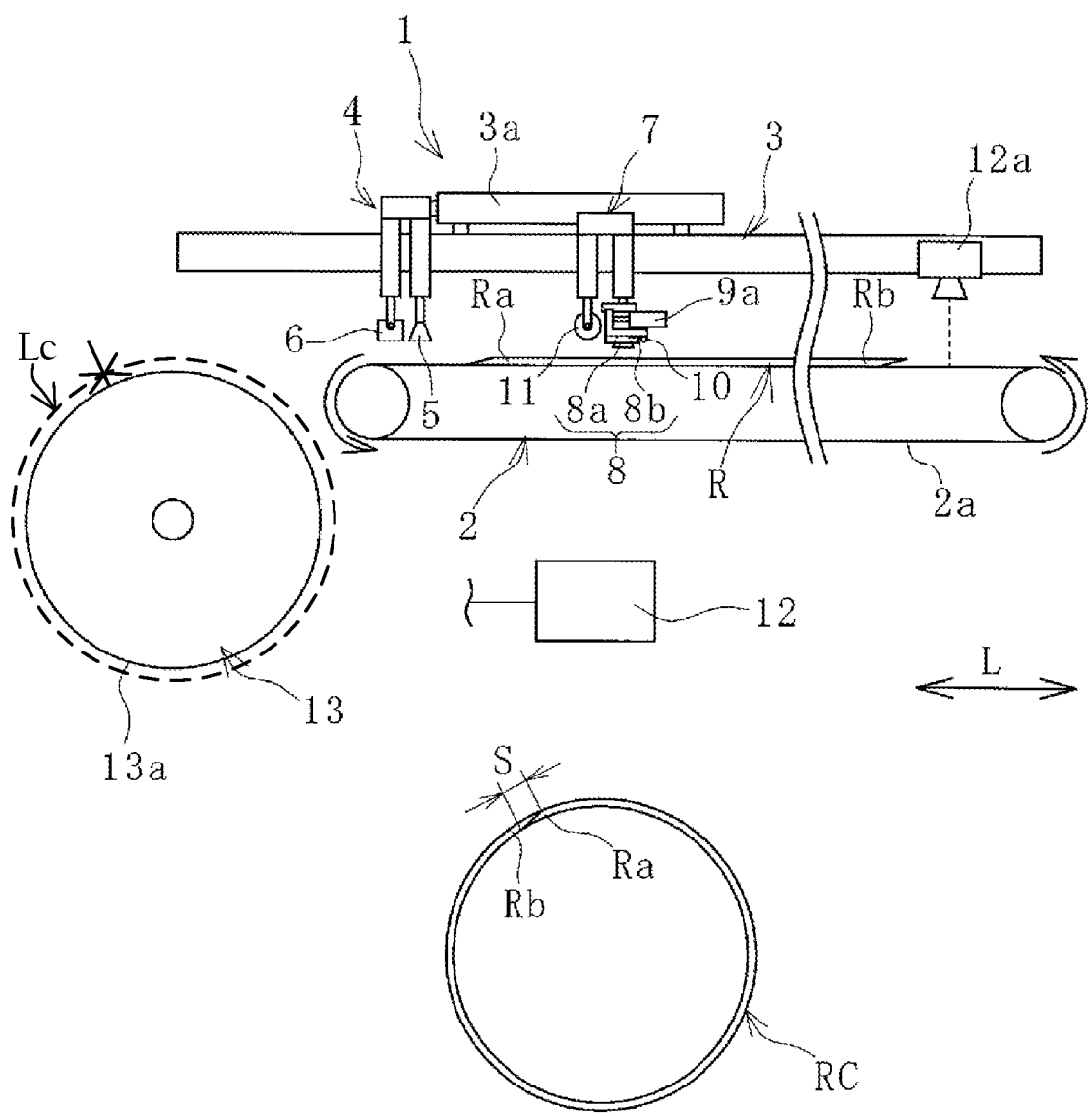
FIG. 1 is an explanatory diagram illustrating, in a side view, a device for producing an unvulcanized ring-shaped rubber member of the present technology, and the produced ring-shaped rubber member.

Hereinafter, a device and a method for producing an unvulcanized ring-shaped rubber member according to the present technology will be described on the basis of embodiments with reference to the drawings.

An unvulcanized ring-shaped rubber member producing device 1 (hereinafter referred to as a producing device 1) of the present technology illustrated in FIGS. 1 to 4 bonds a longitudinal front edge portion Ra and a rear edge portion Rb of an unvulcanized band-like rubber member R on an outer circumferential surface 13a of a forming drum 13. As a result, the band-like rubber member R is formed into a ring shape (cylindrical shape) to produce an unvulcanized ring-shaped rubber member RC. Note that the ring-shaped rubber member RC also includes a cylindrical rubber member. Examples of the band-like rubber member R include tire components such as tread rubber, side rubber, and the like of a tire formed from unvulcanized rubber.

The producing device 1 includes: a transport conveyor 2; a front edge arrangement mechanism 4 that holds and disposes the front edge portion Ra of the band-like rubber member R onto the outer circumferential surface 13a of the forming drum 13; a rear edge bonding mechanism 7 that holds and bonds the rear edge portion Rb of the band-like rubber member R to the front edge portion Ra of the band-like rubber member R wound on the outer circumferential surface 13a; and a control unit 12. The movement of the transport conveyor 2, the front edge arrangement mechanism 4, and the rear edge bonding mechanism 7 is controlled by the control unit 12.

The transport conveyor 2 transports the placed band-like rubber member R toward the forming drum 13 disposed at the front. The transport conveyor 2 includes a conveyor belt 2a that is stretched between front and rear pulleys, wherein the conveyor belt 2a is rotationally driven by a drive source such as a servo motor.

Figure 2:
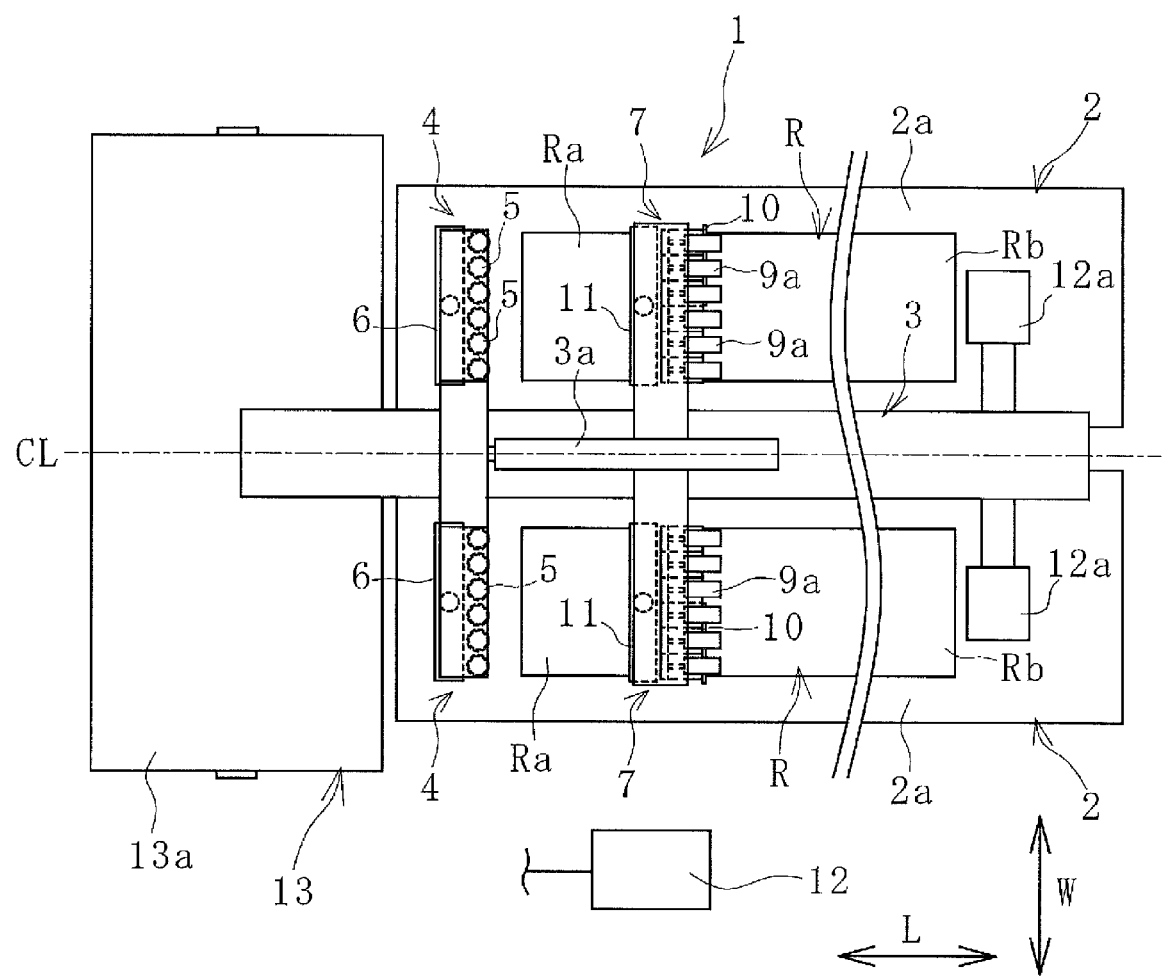
FIG. 2 is an explanatory diagram illustrating the producing device of FIG. 1 in a plan view.
Figure 3:
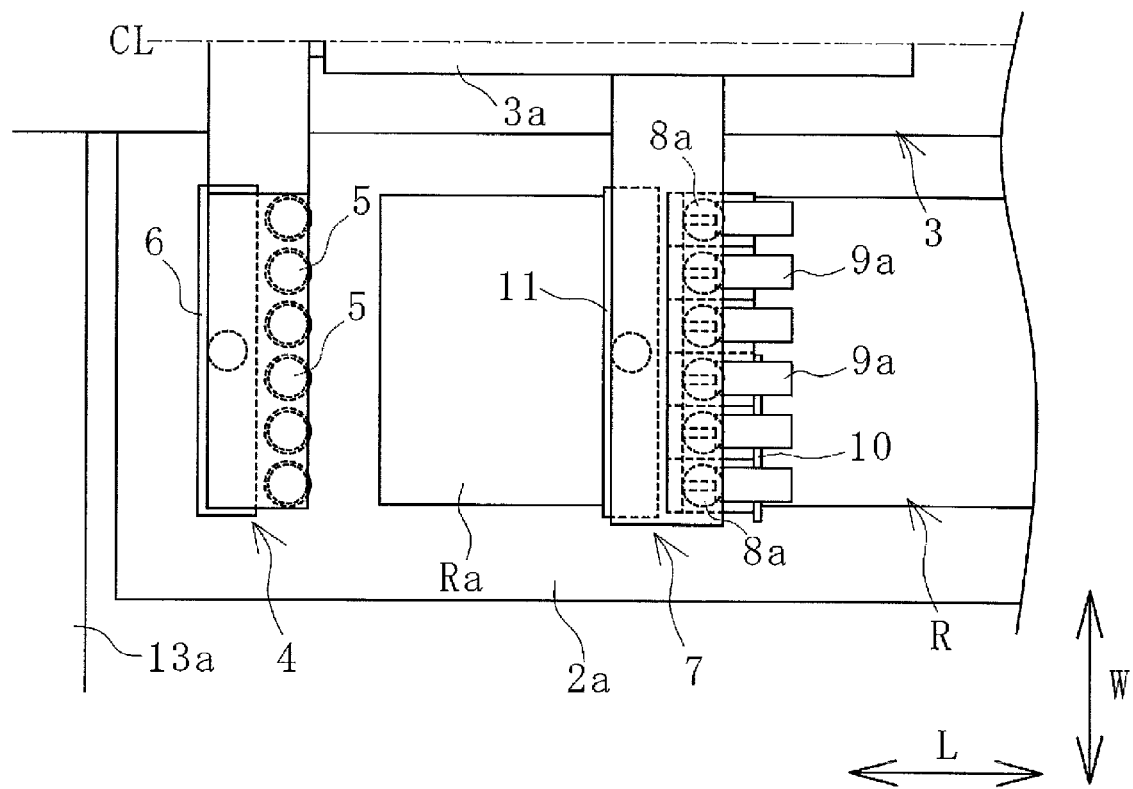
FIG. 3 is an enlarged view illustrating a part of FIG. 2.
Figure 4:
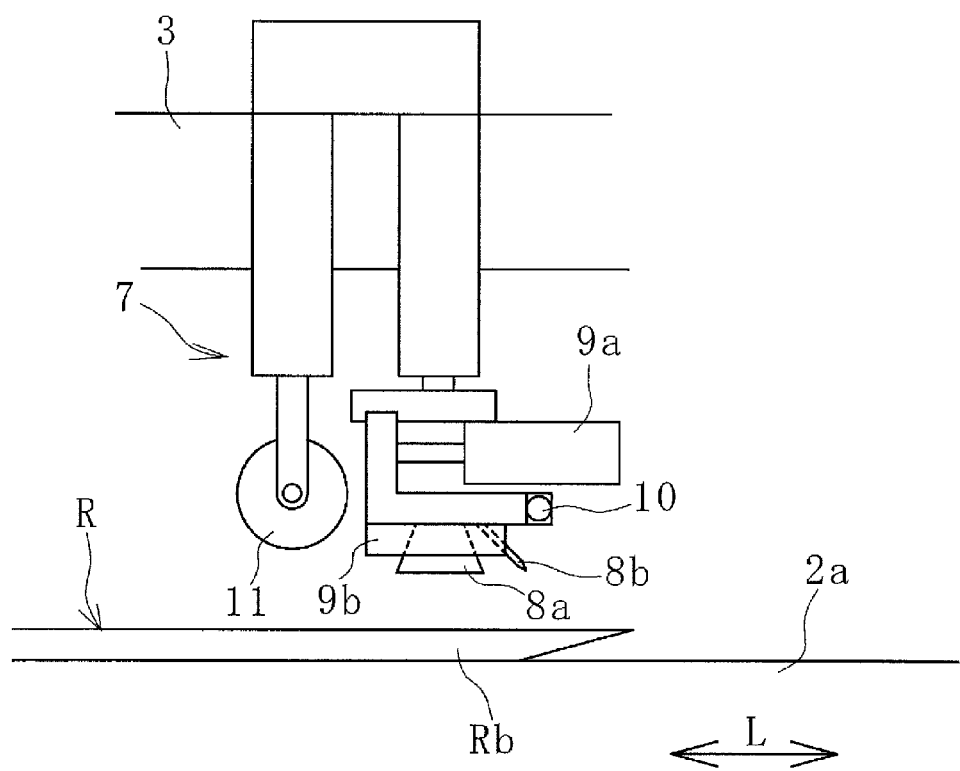
FIG. 4 is an explanatory diagram illustrating an enlarged rear edge bonding mechanism in a side view.

The direction of an arrow L in the drawings indicates the front-rear direction of the transport conveyor 2 and the band-like rubber member R mounted on the transport conveyor 2. Furthermore, the direction of an arrow W indicates the width direction of the transport conveyor 2, the band-like rubber member R mounted on the transport conveyor 2, and the forming drum 13. Note that a dot-dash line CL in FIG. 2 represents the center position of the forming drum 13 in the width direction.

In this embodiment, transport conveyors 2 are disposed symmetrically one by one with the drum width direction center line CL therebetween. A frame 3 extending in the front-rear direction L is provided between the transport conveyors 2. The front edge arrangement mechanism 4 and the rear edge bonding mechanism 7 arranged above each conveyor belt 2a are movably attached to the frame 3. A position sensor 12a disposed above a rear edge portion of each of the conveyor belts 2a is attached to the frame 3.

The devices (the transport conveyor 2, the front edge arrangement mechanism 4, the rear edge bonding mechanism 7, the position sensor 12a, and the like) disposed symmetrically with the drum width direction center line CL therebetween are each configured and moved in the same manner. Therefore, the devices disposed on one side across the drum width direction center line CL will be described below. Note that the devices such as the transport conveyor 2, the front edge arrangement mechanism 4, the rear edge bonding mechanism 7, and the position sensor 12a are not limited to a configuration in which these devices are installed in parallel in two rows with the drum width direction center line CL therebetween, as in this embodiment, but can be configured to be installed in one row.

The front edge arrangement mechanism 4 includes a front edge holding portion 5 and a front edge pressing portion 6. In this embodiment, an adsorption pad is used as the front edge holding portion 5. The front edge holding portion 5 is moved up and down by a cylinder or the like, and moves close to and away from the placement surface of the conveyor belt 2a. A plurality of the front edge holding portions 5 are arranged side by side in the width direction W.

One rod-like body that extends in the width direction W is adopted as the front edge pressing portion 6. The front edge pressing portion 6 can be divided in the width direction W into a plurality of parallel configurations. The front edge pressing portion 6 is moved up and down by a cylinder or the like, and moves close to and away from the placement surface of the conveyor belt 2*a*. The front edge arrangement mechanism 4 (front edge holding portion 5 and front edge pressing portion 6) moves in the front-rear direction L by an advancing/retracting cylinder 3*a* installed in the frame 3, and moves close to and away from the forming drum 13.

The rear edge bonding mechanism 7 includes: a plurality of rear edge holding portions 8 arranged side by side in the width direction W; and a movement portion 9*a* that moves the rear edge holding portions 8 individually in the front-rear direction L. In this embodiment, needle shaped bodies 8*b* are employed in addition to adsorption pads 8*a* as the rear edge holding portions 8. The adsorption pad 8*a* projects downward by approximately 1 mm or more and 2 mm or less from a bottom surface of a block base 9*b* to which the adsorption pad 8*a* is attached. The adsorption pad 8*a* can swing in the width direction W and the front-rear direction L.

The needle shaped body 8*b* is disposed projecting obliquely rearward from the block base 9*b*. Note that the needle shaped body 8*b* may be optionally provided. An electric cylinder is used as the movement portion 9*a*, but a fluid cylinder can also be used. When the movement portion 9*a* moves the block base 9*b* in the front-rear direction L, the rear edge holding portion 8 moves in the front-rear direction L.

In this embodiment, all of the rear edge holding portions 8 arranged side by side in the width direction W are configured to be movable in the front-rear direction L, but only some of the rear edge holding portions 8 can be configured to be movable in the front-rear direction L. For example, only two or three rear edge holding portions 8 adjacent in the width direction W may be configured to be movable in the front-rear direction L. The number of rear edge holding portions 8 arranged side by side is preferably three or more, or, for example, three or more and eight or less. In this embodiment, the size of each of the rear edge holding portions 8 is identical in the width direction W, but the rear edge holding portions 8 having different sizes in the width direction W can also be mixed in.

In this embodiment, the rear edge bonding mechanism 7 further includes: one pressing bar 10 disposed rearward of the rear edge holding portion 8 and extending in the width direction W; and one pressing roller 11 disposed in front of the rear edge holding portion 8. The pressing bar 10 installed on the block base 9*b* can move up and down uniquely. The pressing bar 10 can extend at an appropriate length in the width direction W, and, in this embodiment, extends from one end side of six rear edge holding portions 8 arranged side by side, to a halfway position in the width direction W. The pressing roller 11 can be divided in the width direction W into a plurality of parallel configurations.

The rear edge holding portion 8, the movement portion 9*a*, the block base 9*b*, and the pressing bar 10 are integrally moved up and down by a cylinder or the like, and move close to and away from the placement surface of the conveyor belt 2*a*. The pressing roller 11 is also moved up and down by a cylinder or the like, and moves close to and away from the placement surface of the conveyor belt 2*a*. The rear edge bonding mechanism 7 (the rear edge holding portion 8, the movement portion 9*a*, the block base 9*b*, the pressing bar 10, and the pressing roller 11) moves in the front-rear direction L along the frame 3 by a servo motor or the like, and moves close to and away from the forming drum 13.

The position sensor 12*a* detects the front edge and the rear edge of the band-like rubber member R placed and conveyed on the transport conveyor 2, along the entire length of the width direction W. In other words, the distribution data of the length of the band-like rubber member R in the width direction W is detected. The detection data from the position sensor 12*a* is input successively to the control unit 12. A non-contact sensor (optical sensor, laser sensor, ultrasonic sensor, or the like) may be used as the position sensor 12*a*. The movement of the forming drum 13 is also controlled by the control unit 12, and the rotation speed, the circumferential direction position data, and the like of the forming drum 13 are successively input to the control unit 12.

In addition, the data on a circumferential length Lc on the outer circumferential surface 13*a*, the data on an allowable bonding margin S, and the like are input to the control unit 12. The circumferential length Lc is the circumferential length of the outer circumferential surface around which the band-like rubber member R is wound, and when the band-like rubber member R is wound directly around the forming drum 13, the circumferential length Lc is the circumferential length of the outer circumferential surface 13*a* of the forming drum 13. When the band-like rubber member R is wound around the outer circumferential surface of the member already wound around the forming drum 13, the circumferential length of the outer circumferential surface of the already wound member is the circumferential length Lc. The allowable bonding margin S is preset, and is an appropriate amount of overlap in the front-rear direction L when bonding the front edge portion Ra and the rear edge portion Rb. If the bonding margin between the front edge portion Ra and the rear edge portion Rb is too small, the two cannot be firmly bonded, and if excessive, the tire uniformity and the like are adversely affected.

Now, an example of the steps of producing the ring-shaped rubber member RC using the producing device 1 will be explained.

As illustrated in FIG. 1, the band-like rubber member R is conveyed toward the forming drum 13 by rotationally driving the conveyor belt 2*a* on which the band-like rubber member R is placed. The band-like rubber member R contracts over time in an unconstrained state. The position sensor 12*a* detects the front edge and the rear edge of the band-like rubber member R passing downward throughout the width direction W, and the detection data is successively input to the control unit 12. Based on the detection data and the conveyance speed of the transport conveyor 2, the control unit 12 calculates and acquires the distribution data of the length of the band-like rubber member R in the width direction W.

Figure 5:
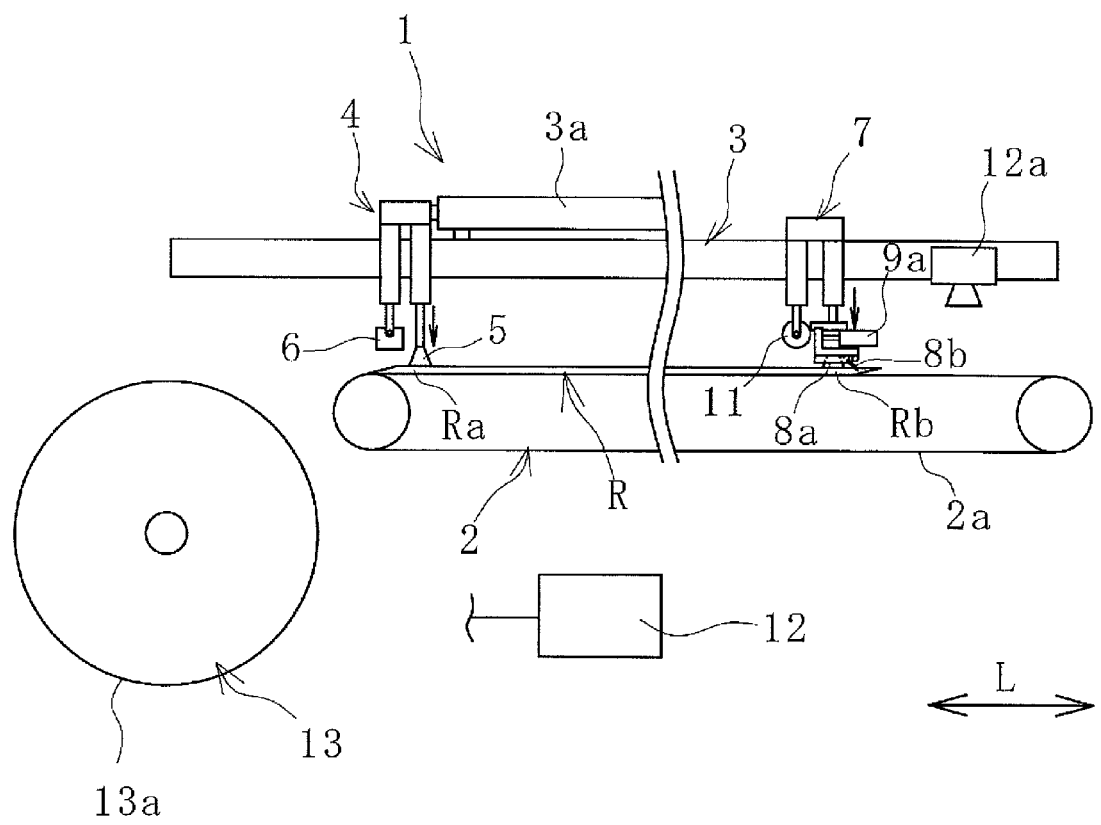
FIG. 5 is an explanatory diagram illustrating, in a side view, a step of holding a front edge portion and a rear edge portion of a band-like rubber member by a front edge holding portion and a rear edge holding portion, respectively.

After the band-like rubber member R is conveyed until the front edge portion Ra is positioned in front of the conveyor belt 2*a*, the conveyor belt 2*a* is stopped. Next, as illustrated in FIG. 5, the front edge holding portion 5 is moved downward, brought into contact with a top surface of the front edge portion Ra, and adhered thereto by sucking air. In this step, the front edge pressing portion 6 is in an upper position in which the front edge pressing portion 6 does not contact the front edge portion Ra.

Figure 6:
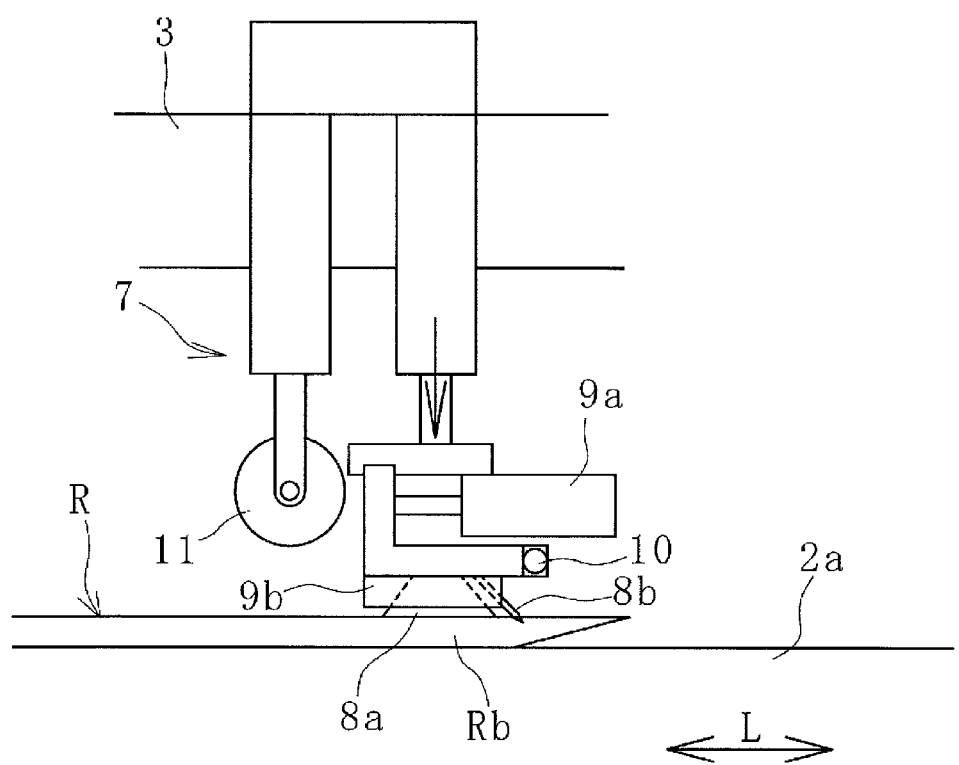
FIG. 6 is an explanatory diagram illustrating an enlarged periphery of the rear edge holding portion of FIG. 5.

Furthermore, as illustrated in FIGS. 5 and 6, the rear edge holding portion 8 is moved downward, and the adsorption pad 8*a* is brought into contact with a top surface of the rear edge portion Rb and is adhered thereto by sucking air. With the downward movement of the adsorption pad 8*a*, the needle shaped body 8*b* penetrates into a position midway in the thickness direction of the band-like rubber member R. In this step, the pressing roller 11 is in an upper position that does not contact the rear edge portion Rb. Note that even when the adsorption pad 8*a* is moved downward to the position of the conveyor belt 2*a* in a state where the band-like rubber member R is not placed on the conveyor belt 2a, the needle shaped body 8b is set so as not to contact the conveyor belt 2a.

The thickness of the band-like rubber member R is not constant in the width direction W, and is often changed. That is, since the band-like rubber member R often has a unique cross-sectional shape (profile) rather than a simple quadrangular cross-section, the thickness (weight) of the band-like rubber member R at the position where each adsorption pad 8a is adsorbed is not the same. Therefore, the adsorption force by each adsorption pad 8a is not limited to being set to the same, but can be set differently depending on the thickness of the band-like rubber member R at the position at which each adsorption pad 8a adsorbs. For example, the adsorption pad 8a that adsorbs at a position where the thickness of the band-like rubber member R is greater increases the suction force. Similarly, the adsorption pad of the front edge holding portion 5 can also have a configuration in which the suction force differs depending on the position in the width direction W.

Figure 7:
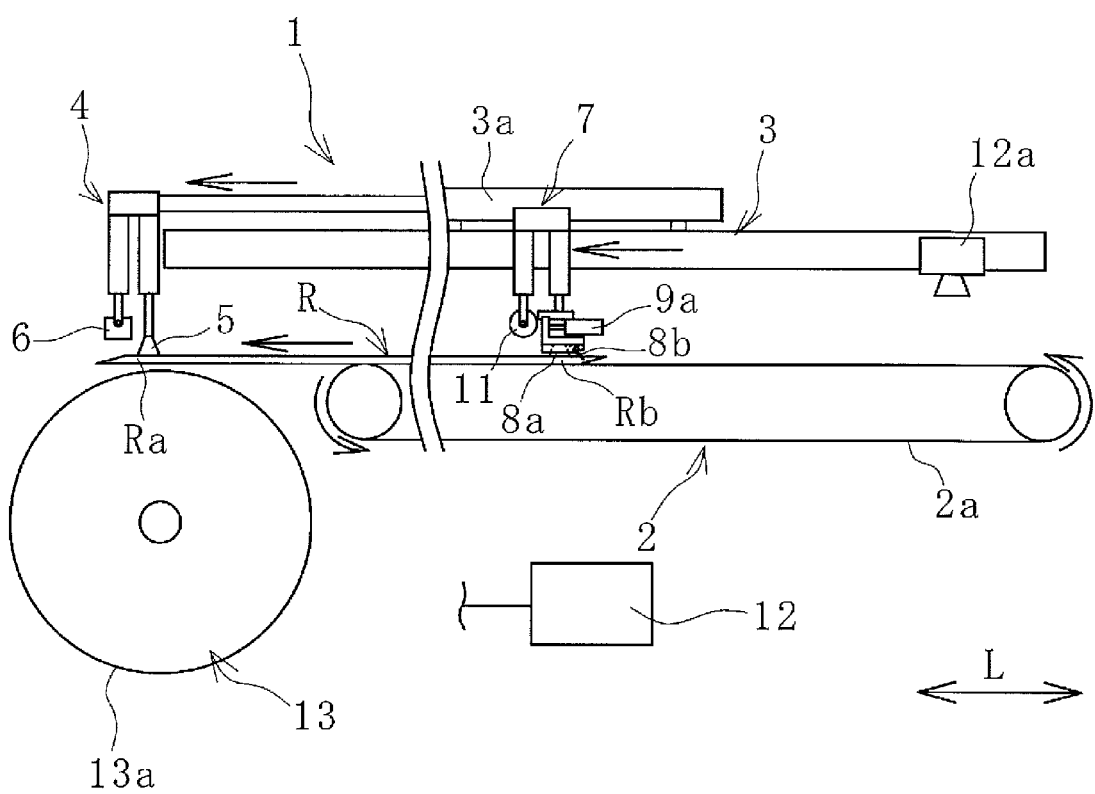
FIG. 7 is an explanatory diagram illustrating, in a side view, a step of moving the front edge portion of the band-like rubber member onto an outer circumferential surface of a forming drum.

Next, as illustrated in FIG. 7, the band-like rubber member R is conveyed toward the forming drum 13 by rotationally driving the conveyor belt 2a. At this time, the front edge arrangement mechanism 4 is advanced by the advancing/retracting cylinder 3a at the same speed by synchronizing the front edge arrangement mechanism 4 with the band-like rubber member R to be conveyed. Furthermore, the rear edge bonding mechanism 7 is advanced along the frame 3 at the same speed in synchronization with the band-like rubber member R to be conveyed.

Accordingly, the band-like rubber member R is conveyed toward the forming drum 13 while having the front edge portion Ra and the rear edge portion Rb held by the front edge holding portion 5 and the rear edge holding portion 8, respectively. Since the front edge holding portion 5 and the rear edge holding portion 8 advance in synchronization with the band-like rubber member R being conveyed, the interval between each other in the front-rear direction L is maintained constant. Therefore, the band-like rubber member R is transported in a restrained state in which both elongation and contraction are suppressed. After the front edge portion Ra is moved onto the outer circumferential surface 13a of the forming drum 13 while being held by the front edge holding portion 5, the transportation by the transport conveyor 2 and the advancing movement of the front edge arrangement mechanism 4 and the rear edge bonding mechanism 7 are stopped.

Figure 8:
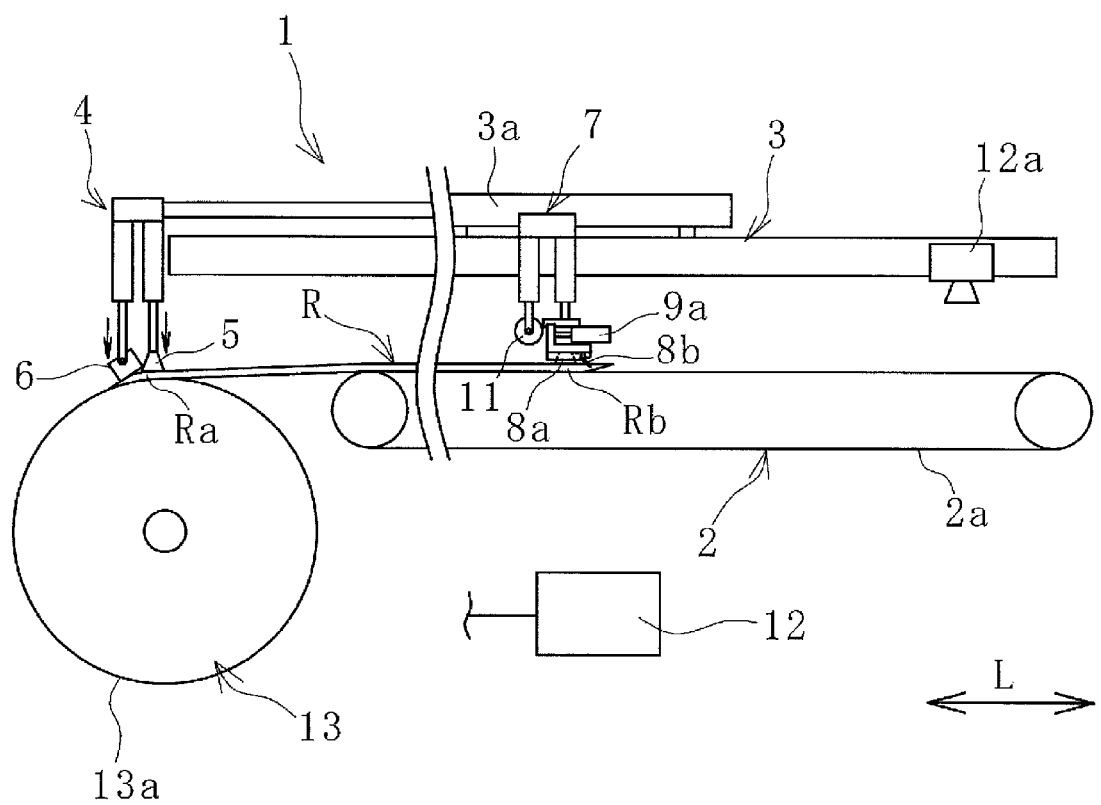
FIG. 8 is an explanatory diagram illustrating, in a side view, a step of disposing the front edge portion of the band-like rubber member onto the outer circumferential surface of the forming drum.

Next, as illustrated in FIG. 8, the front edge holding portion 5 is moved downward, and the front edge portion Ra, the hold of which has been released, is disposed onto the outer circumferential surface 13a of the forming drum 13. Here, the front edge pressing portion 6 is moved downward, and the front edge portion Ra is firmly attached to the outer circumferential surface 13a. The position where the front edge portion Ra is disposed onto the outer circumferential surface 13a of the forming drum 13 is preferably a top portion of the forming drum 13 in a drum circumferential direction. Accordingly, the front edge portion Ra is more stably positioned and easily attached to the outer circumferential surface 13a.

Figure 9:
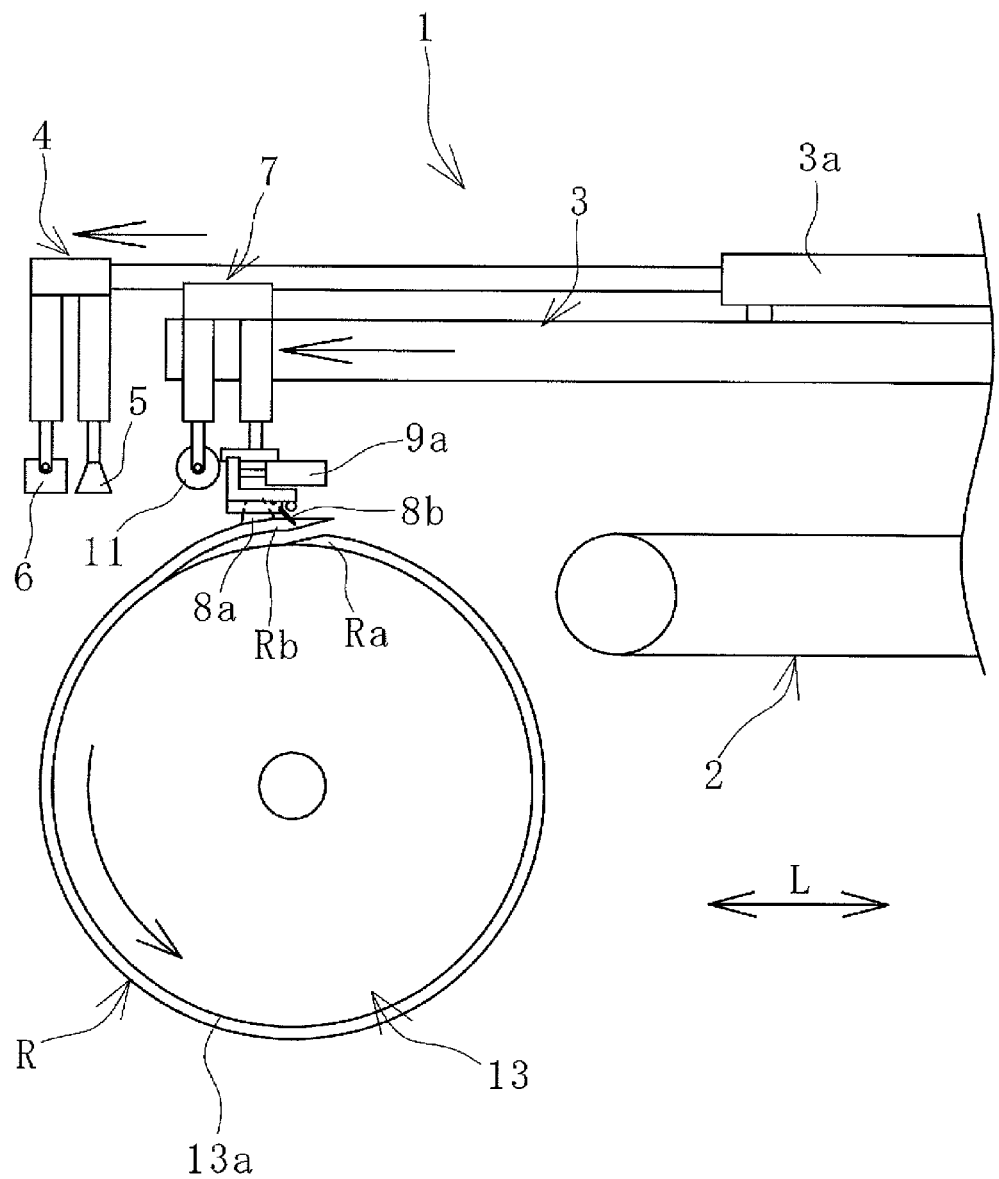
FIG. 9 is an explanatory diagram illustrating, in a side view, a step of winding the band-like rubber member around the outer circumferential surface of the forming drum.

Next, as illustrated in FIG. 9, the forming drum 13 is rotated, and the conveyor belt 2a is rotationally driven in synchronization with this rotation, to convey the band-like rubber member R toward the forming drum 13, and the rear edge bonding mechanism 7 is advanced along the frame 3 in synchronization with the band-like rubber member R being conveyed. The peripheral velocity on the outer circumferential surface 13a, the conveyance speed of the transport conveyor 2, and the movement velocity of the rear edge bonding mechanism 7 are preferably identical to each other. At this time, the front edge arrangement mechanism 4 is moved further forward by the advancing/retracting cylinder 3a and is not in contact with the band-like rubber member R.

Figure 10:
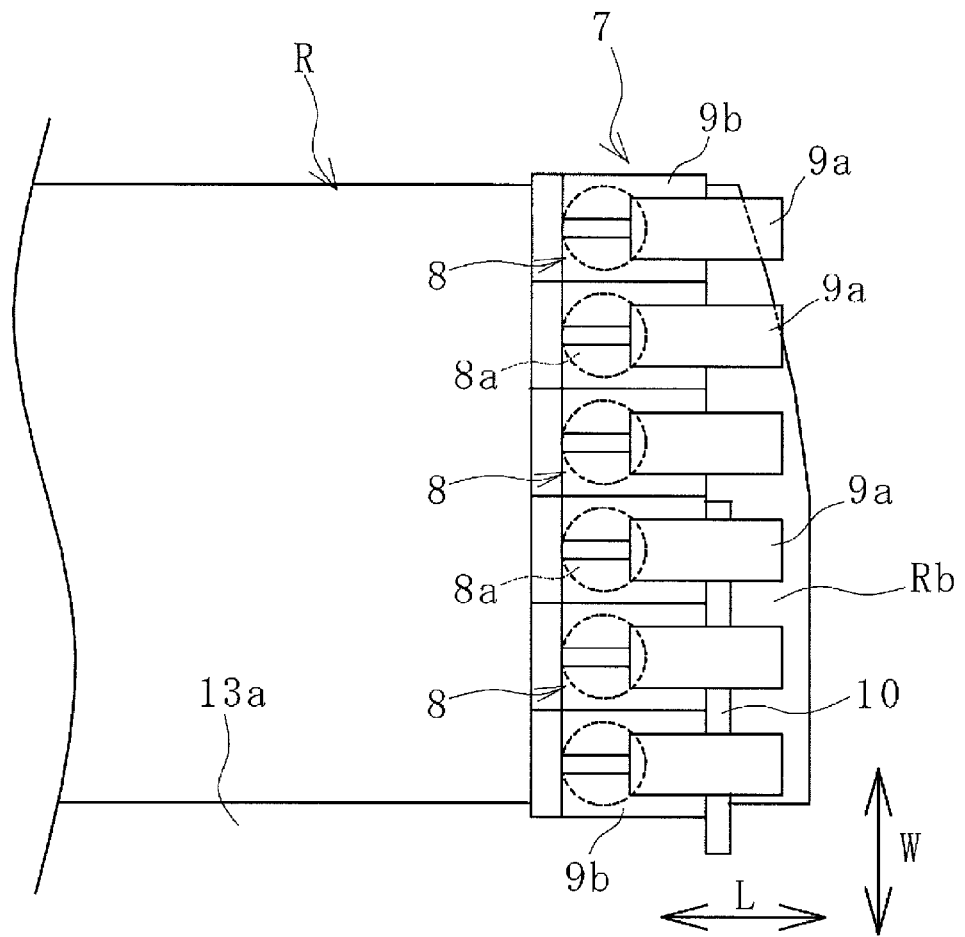
FIG. 10 is an explanatory diagram illustrating the periphery of the rear edge portion of the band-like rubber member of FIG. 9 in a plan view.

In this manner, after a predetermined length of the band-like rubber member R is wound around the outer circumferential surface 13a of the forming drum 13, the rotation of the forming drum 13 and the advancing movement of the rear edge bonding mechanism 7 are stopped. In other words, the band-like rubber member R is wound around the outer circumferential surface 13a except for the rear edge portion Rb and a peripheral portion thereof. At this time, as illustrated in FIG. 10, the rear edge portion Rb is held by the plurality of rear edge holding portions 8 arranged side by side in the width direction W, and each of the rear edge holding portions 8 is individually movable in the front-rear direction L by the movement portions 9a corresponding to the respective rear edge holding portions 8.

Figure 11:
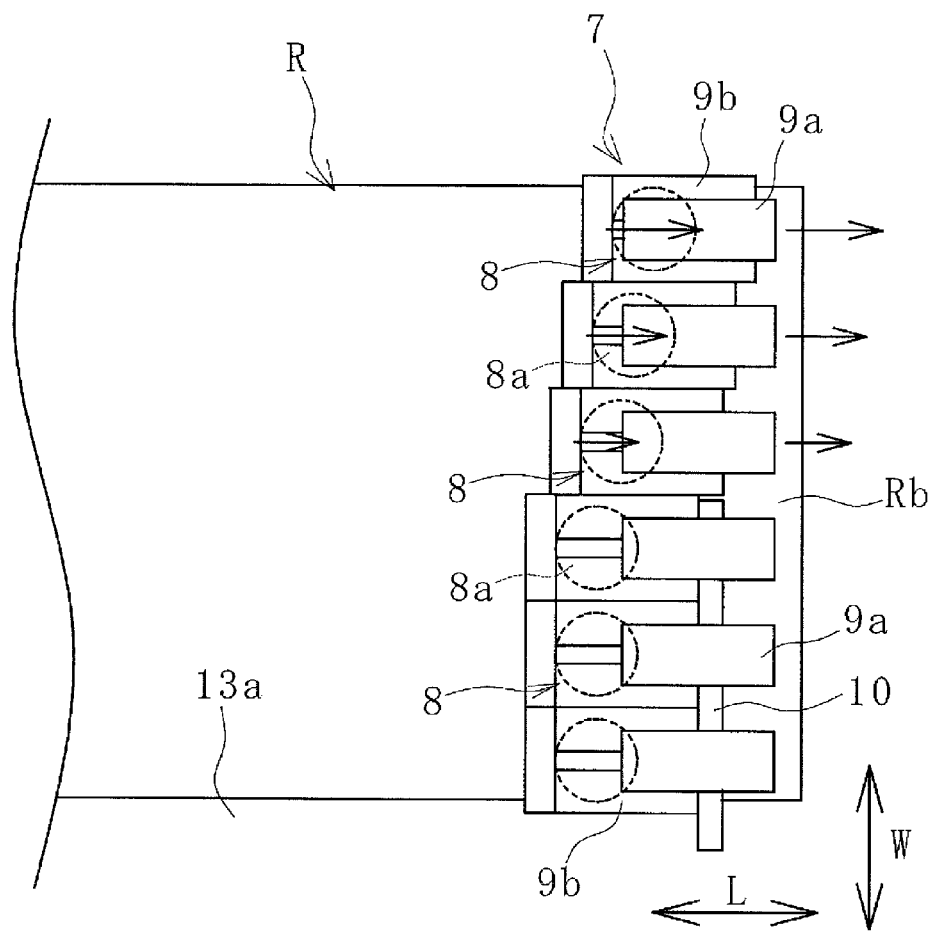
FIG. 11 is an explanatory diagram illustrating, in a plan view, a step of stretching the rear edge portion of the band-like rubber member of FIG. 10.

Next, as illustrated in FIG. 11, before bonding the rear edge portion Rb to the front edge portion Ra, the amount of movement of each of the movement portions 9a in the front-rear direction L is controlled by the control unit 12 using the distribution data on the length of the band-like rubber member R in the width direction W. For example, on the basis of the distribution data on the length of the band-like rubber member R in the width direction W, the data on the circumferential length Lc on the outer circumferential surface 13a, and the data on the allowable bonding margin S, the control unit 12 controls the amount of movement of each of the movement portions 9a in the front-rear direction L.

By controlling the amount of movement of each of the movement portions 9a, the elongation around the held portion of the rear edge portion Rb in the front-rear direction L that is held by each of the rear edge holding portions 8 is adjusted. For example, in the rear edge holding portion 8 in the width direction position where the contraction of the band-like rubber member R in the front-rear direction L is greater, the amount of movement in the front-rear direction L is increased. In this embodiment, the higher the positions of the upper three movement portions 9a in the drawing, the greater the amount of movement, and the amount of movement of the lower three movement portions 9a in the drawing is zero. As a result of such control of the amount of movement, the length of the band-like rubber member R is adjusted to a length that allows the front edge portion Ra and the rear edge portion Rb to be bonded by the allowable bonding margin S.

The movement velocity of each of the movement portions 9a in the front-rear direction L can be varied, but may preferably be set at an identical velocity. Even in a case where the amounts of movement of the respective rear edge holding portions 8 in the front-rear direction are different, setting each movement velocity to the identical velocity is advantageous in preventing the occurrence of defects such as damage to the unvulcanized rubber (rear edge portion Rb) to be elongated, without forcibly applying an external force thereto.

Figure 12:
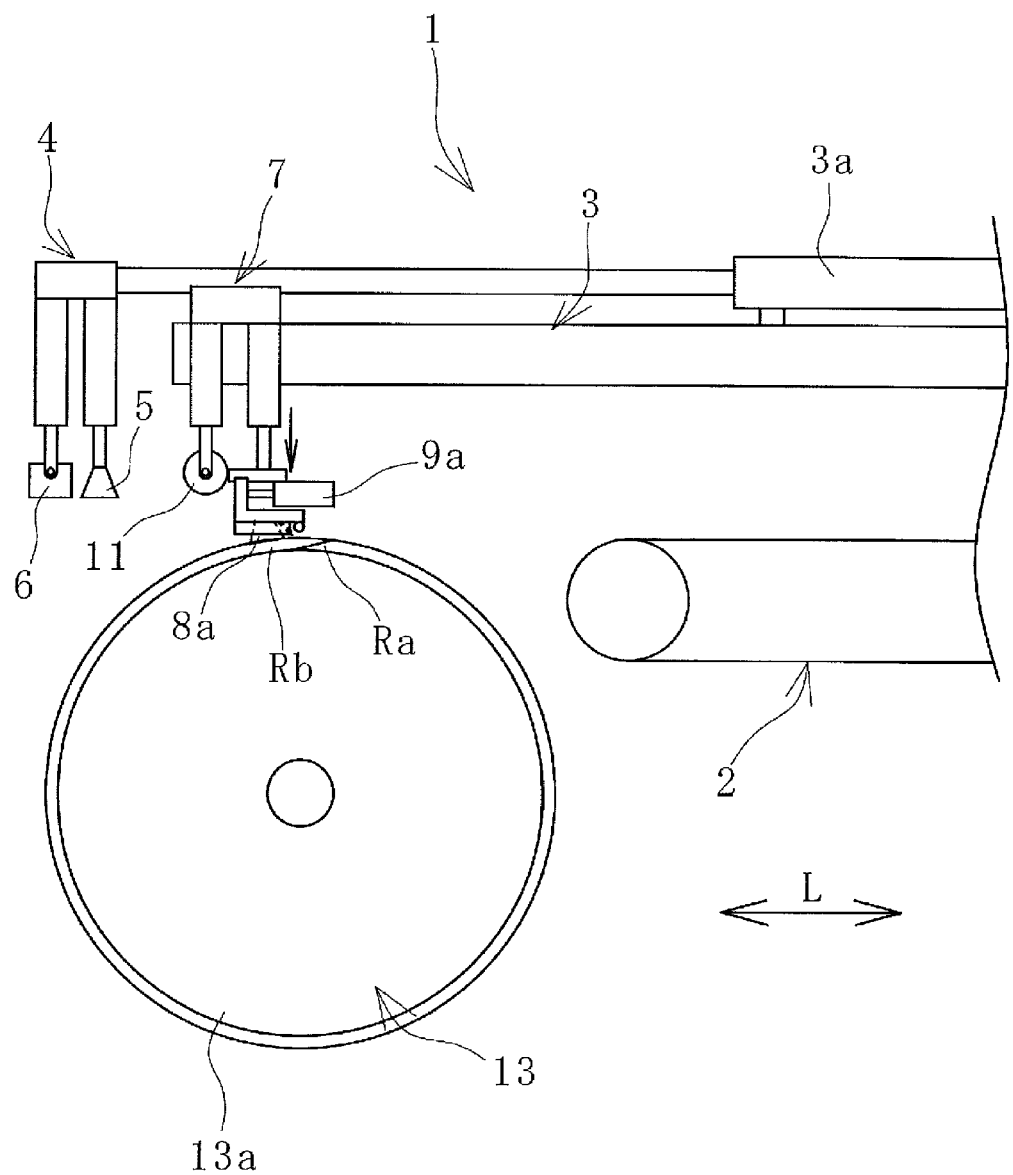
FIG. 12 is an explanatory diagram illustrating, in a side view, a step of bringing the rear edge portion of the band-like rubber member close to the front edge portion.
Figure 13:
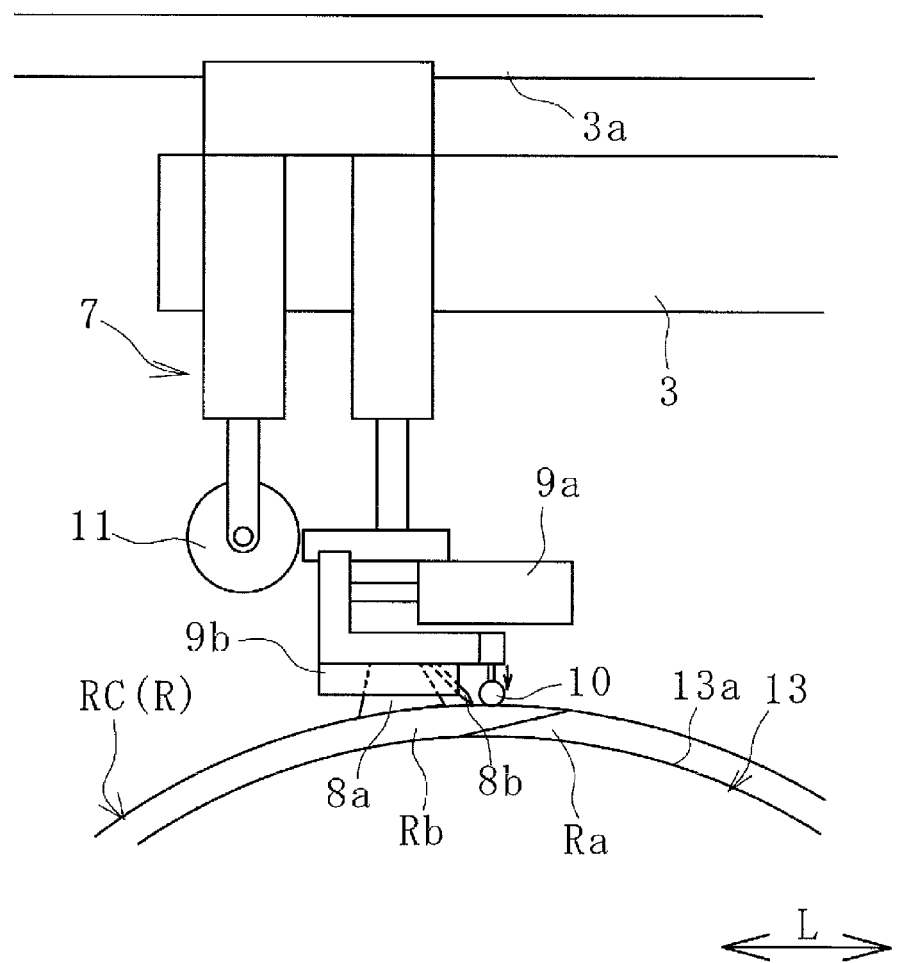
FIG. 13 is an explanatory diagram illustrating, in a side view, a step of releasing a hold of the rear edge portion of the band-like rubber member and compression-bonding the rear edge portion to the front edge portion.

Next, as illustrated in FIG. 12, the rear edge holding portion 8 is moved downward to bring the held rear edge portion Rb into contact with the front edge portion Ra wound around the outer circumferential surface 13a. Thereafter, as illustrated in FIG. 13, the suction by the adsorption pad 8a is stopped and the hold by the adsorption pad 8a with respect to the rear edge portion Rb is released.

Immediately after this step, the pressing bar 10 is moved downward, and the rear edge portion Rb and the front edge portion Ra are compression-bonded by pressing the top surface of the rear edge portion Rb, to form the ring-shaped rubber member RC. In this way, when the pressing bar 10 disposed on the top surface side of the rear edge portion Rb and extending in the width direction W is moved toward the top surface of the rear edge portion Rb to press the rear edge portion Rb, the rear edge portion Rb and the front edge portion Ra can be bonded firmly. When the hold by the rear edge holding portion 8 is released, the band-like rubber member R tries to contract. However, by pressing the rear edge portion Rb with the pressing bar 10, the bonded portion between the rear edge portion Rb and the front edge portion Ra can be prevented from opening, which is advantageous in suppressing contraction of the band-like rubber member R.

Employing the adsorption pad 8a as the rear edge holding portion 8 to adsorb and hold the top surface of the rear edge portion Rb is advantageous in maintaining the rear edge portion Rb without unnecessarily deforming the rear edge portion Rb. Employing the needle shaped body 8b as in this embodiment is advantageous in reliably holding the rear edge portion Rb, making it easier to elongate the rear edge portion Rb in the front-rear direction L.

Figure 14:
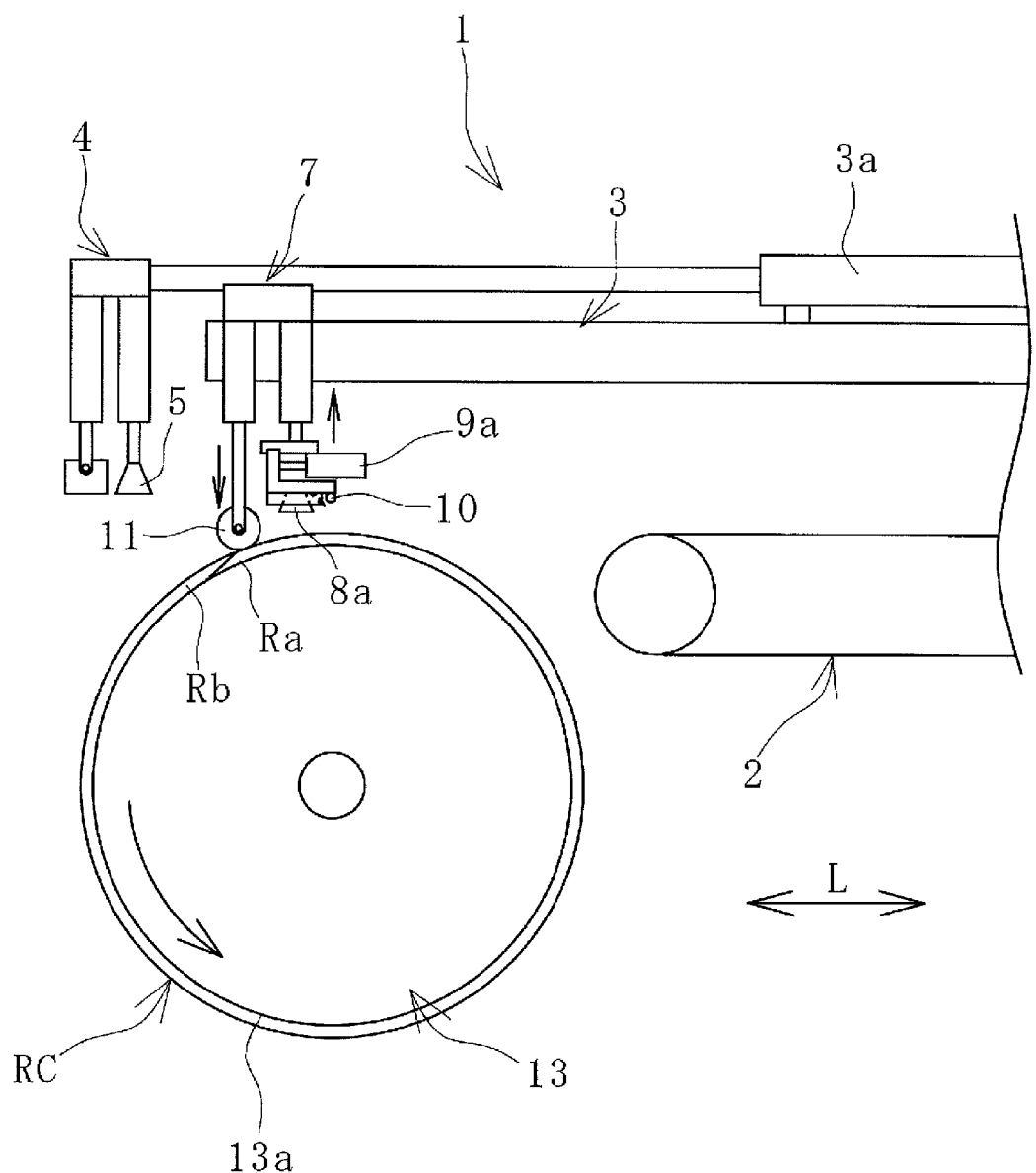
FIG. 14 is an explanatory diagram illustrating, in a side view, a step of further compression-bonding the front edge portion and the rear edge portion.

Next, as illustrated in FIG. 14, the pressing roller 11 is moved downward to come into abutment with the outer circumferential surface of the ring-shaped rubber member RC, to rotate the forming drum 13. Accordingly, the bonded portion between the rear edge portion Rb and the front edge portion Ra is further compression-bonded by the pressing roller 11 to reliably prevent the bonded portion from opening. In this step, the rear edge holding portion 8 is moved to a position where the rear edge holding portion 8 does not contact the ring-shaped rubber member RC.

Figure 15:
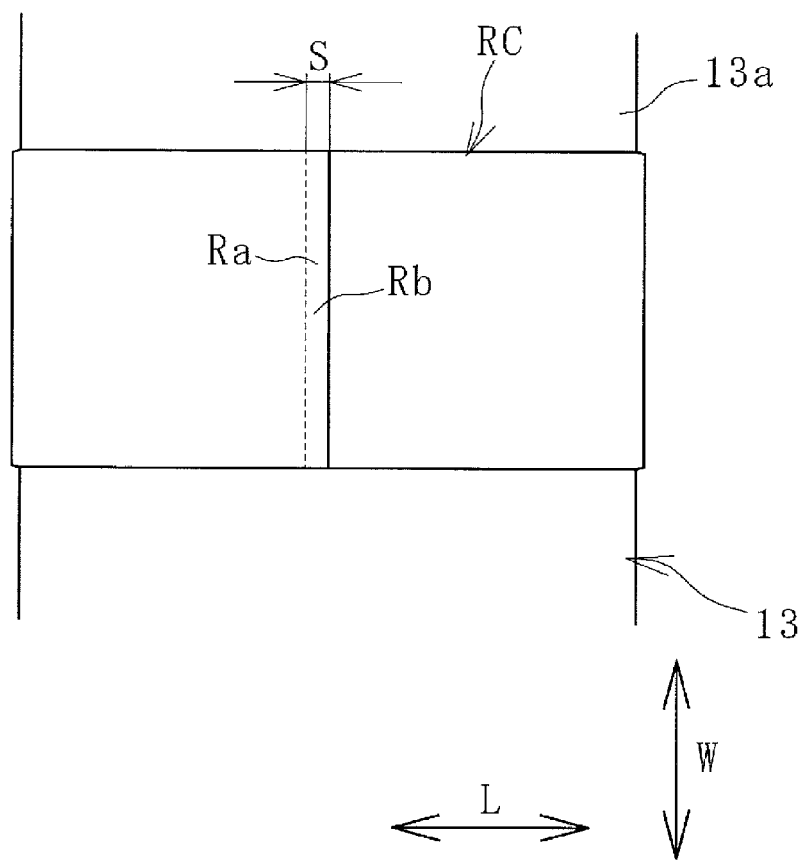
FIG. 15 is an explanatory diagram illustrating a bonded portion between the front edge portion and the rear edge portion in a plan view.

As described above, after elongation in the front-rear direction L by a necessary amount around the held portion of the rear edge portion Rb held by each of the rear edge holding portions 8, to adjust the band-like rubber member R to a length that ensures the allowable bonding margin S, the front edge portion Ra and the rear edge portion Rb are bonded. As a result, as illustrated in FIG. 15, the ring-shaped rubber member RC can be produced in which the front edge portion Ra and the rear edge portion Rb are bonded by the allowable bonding margin S evenly and reliably across the entire width direction W. Even in the case of the band-like rubber member R that greatly contracts over time, the front edge portion Ra and the rear edge portion Rb can be bonded reliably with the allowable bonding margin S.

Figure 16:
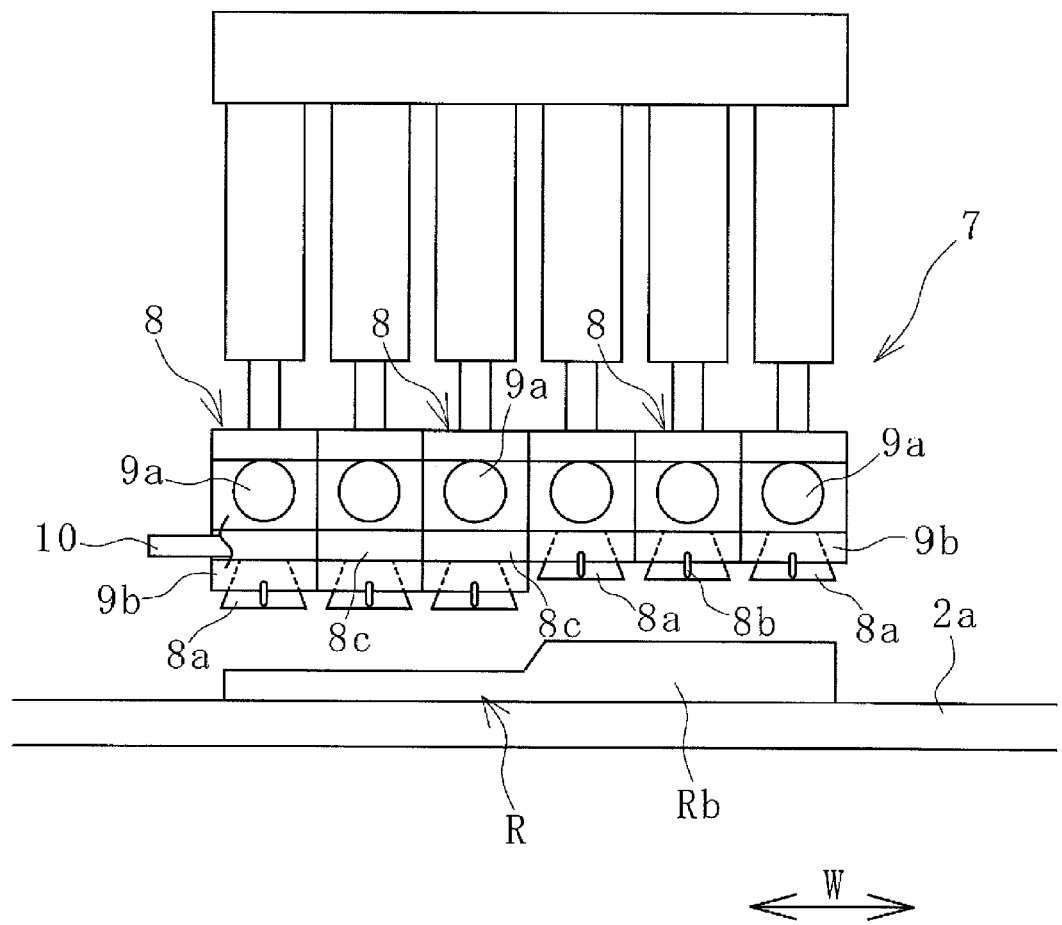
FIG. 16 is an explanatory diagram illustrating a modified example of the rear edge holding portion in a front view.

As illustrated in FIG. 16, for the band-like rubber member R having a unique cross-sectional shape (profile), a structure is preferable in which the adsorption pad 8a is installed on the block base 9b with a height adjustment portion 8c such as a shim interposed therebetween. In other words, depending on the cross-sectional shape (profile) of the band-like rubber member R, the upper and lower positions of each of the adsorption pads 8a being arranged side by side are appropriately set by interposing the height adjustment portion 8c. This is advantageous in firmly adsorbing and holding the rear edge portion Rb while suppressing the deformation thereof by each of adsorption pads 8a. The holding force by the needle shaped body 8b can also be increased.

Figure 17:
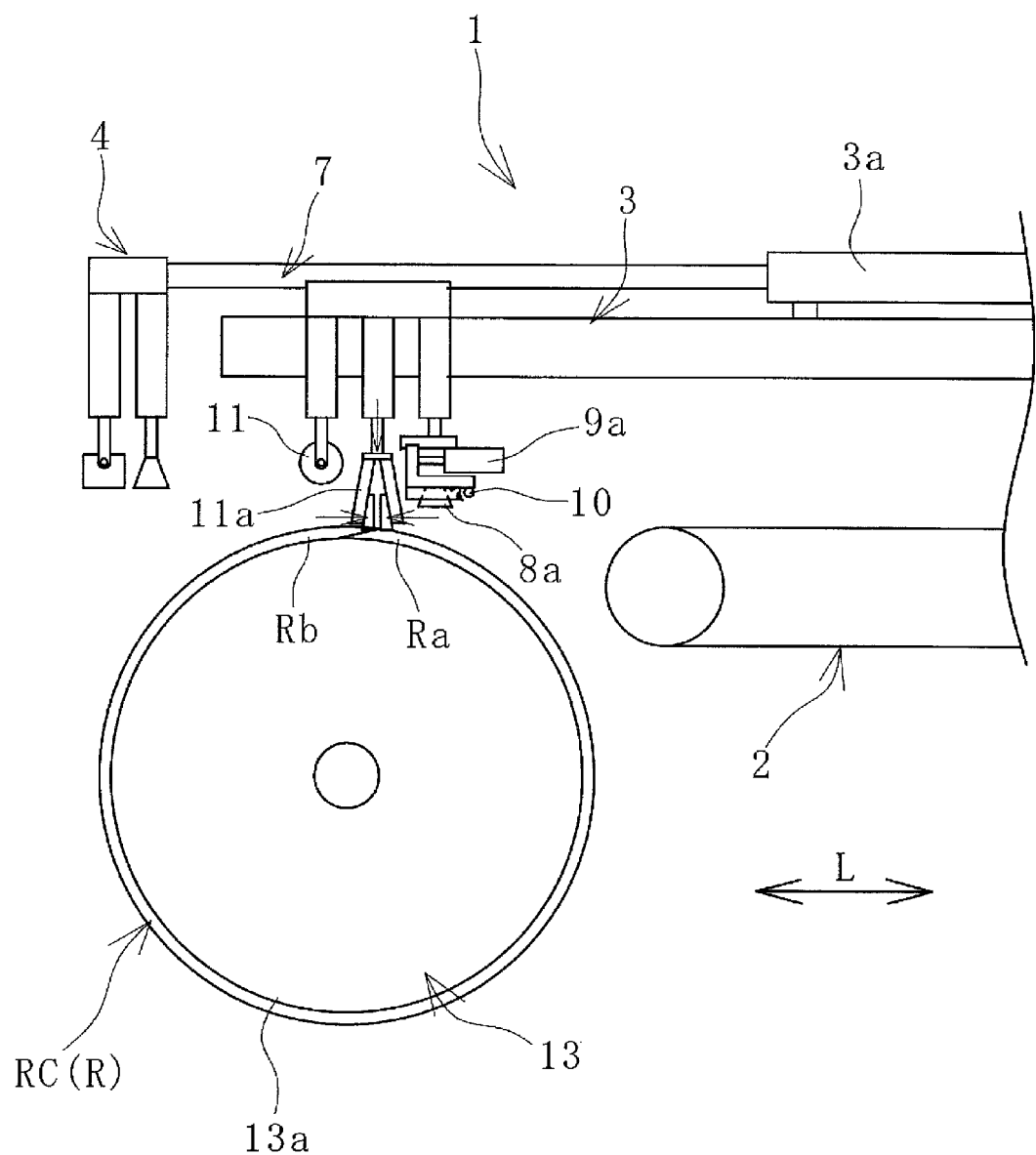
FIG. 17 is an explanatory diagram illustrating a modified example of the rear edge bonding mechanism in a side view.

As illustrated in FIG. 17, the rear edge bonding mechanism 7 can be provided additionally with a pulling portion 11a. The pulling portion 11a has a pair of gripping movable portions facing each other in the front-rear direction L, and can be moved up and down by a cylinder or the like. During the steps illustrated in FIG. 13 and the steps illustrated in FIG. 14, the rear edge portion Rb and the front edge portion Ra that are compression-bonded are gripped by the pulling portion 11a to be brought close to each other. This step by the pulling portion 11a is advantageous in bonding the rear edge portion Rb and the front edge portion Ra more firmly.

The invention claimed is:

1. A device for producing an unvulcanized ring-shaped rubber member, the device comprising:
   a transport conveyor that transports an unvulcanized band-like rubber member toward a forming drum;
   a front edge arrangement mechanism that holds and disposes a front edge portion of the band-like rubber member onto an outer circumferential surface of the forming drum;
   a rear edge bonding mechanism that holds and bonds a rear edge portion of the band-like rubber member to the front edge portion on the outer circumferential surface; and
   a control unit configured to control movement of the transport conveyor, the front edge arrangement mechanism, and the rear edge bonding mechanism,
   the front edge portion and the rear edge portion of the band-like rubber member wound around the outer circumferential surface being bonded by a preset allowable bonding margin,
   the rear edge bonding mechanism comprising a plurality of holding portions arranged side by side in a width direction of the band-like rubber member, and movement portions that individually move each of the holding portions in a front-rear direction of the band-like rubber member, and
   before bonding the rear edge portion to the front edge portion, the control unit controlling an amount of movement of each of the movement portions in the front-rear direction using distribution data on a length of the band-like rubber member in the width direction, and thus a degree of elongation around a held portion of the rear edge portion in the front-rear direction that is held by each of the holding portions being adjusted; wherein
      the rear edge bonding mechanism comprises a pressing bar disposed on a side of a top surface of the rear edge portion and extending in the width direction,
      the rear edge portion is pressed by moving the pressing bar toward the top surface of the rear edge portion, and thus the rear edge portion is bonded to the front edge portion on the outer circumferential surface, and
      the control unit is configured to control the movement portions such that a movement velocity of each of the movement portions in the front-rear direction is identical.

2. The device for producing an unvulcanized ring-shaped rubber member according to claim 1, wherein each of the holding portions includes an adsorption pad that adsorbs the top surface of the rear edge portion to hold the rear edge portion.

3. The device for producing an unvulcanized ring-shaped rubber member according to claim 2, wherein each of the holding portions includes a needle shaped body capable of piercing from a position on the side of the top surface of the rear edge portion to a position midway in a thickness direction of the band-like rubber member.

4. A method for producing an unvulcanized ring-shaped rubber member, the method comprising:

conveying an unvulcanized band-like rubber member toward a forming drum by a transport conveyor;

disposing a front edge portion of the band-like rubber member on an outer circumferential surface of the forming drum;

winding a predetermined length of the band-like rubber member on the outer circumferential surface of the forming drum by rotating the forming drum; and bonding the front edge portion on the outer circumferential surface and a rear edge portion of the band-like rubber member by a preset allowable bonding margin, the rear edge portion being held by a plurality of holding portions arranged side by side in a width direction of the band-like rubber member to allow each of the holding portions to move in a front-rear direction individually by respective movement portions, and before bonding the rear edge portion to the front edge portion, a control unit controlling an amount of movement of the respective movement portions in the front-rear direction using distribution data on a length of the band-like rubber member in the width direction, and thus a degree of elongation around a held portion of the rear edge portion in the front-rear direction that is held by each of the holding portions being adjusted;

wherein the control unit is configured to control the movement portions such that a movement velocity of each of the movement portions in the front-rear direction is identical.

5. A device for producing an unvulcanized ring-shaped rubber member, the device comprising:

a transport conveyor that transports an unvulcanized band-like rubber member toward a forming drum;

a front edge arrangement mechanism that holds and disposes a front edge portion of the band-like rubber member onto an outer circumferential surface of the forming drum;

a rear edge bonding mechanism that holds and bonds a rear edge portion of the band-like rubber member to the front edge portion on the outer circumferential surface; and a control unit configured to control movement of the transport conveyor, the front edge arrangement mechanism, and the rear edge bonding mechanism, the front edge portion and the rear edge portion of the band-like rubber member wound around the outer circumferential surface being bonded by a preset allowable bonding margin, the rear edge bonding mechanism comprising a plurality of holding portions arranged side by side in a width direction of the band-like rubber member, and movement portions that individually move each of the holding portions in a front-rear direction of the band-like rubber member, and before bonding the rear edge portion to the front edge portion, the control unit controlling an amount of movement of each of the movement portions in the front-rear direction using distribution data on a length of the band-like rubber member in the width direction, and thus a degree of elongation around a held portion of the rear edge portion in the front-rear direction that is held by each of the holding portions being adjusted;

wherein the control unit is configured to control the movement portions such that a movement velocity of each of the movement portions in the front-rear direction is identical.

* * * * *